: 3,263,160
Patented July 26, 1966

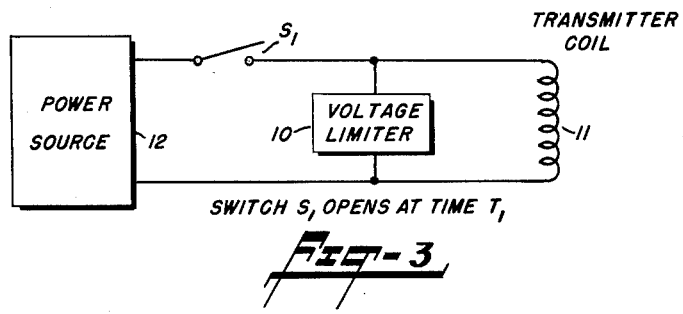
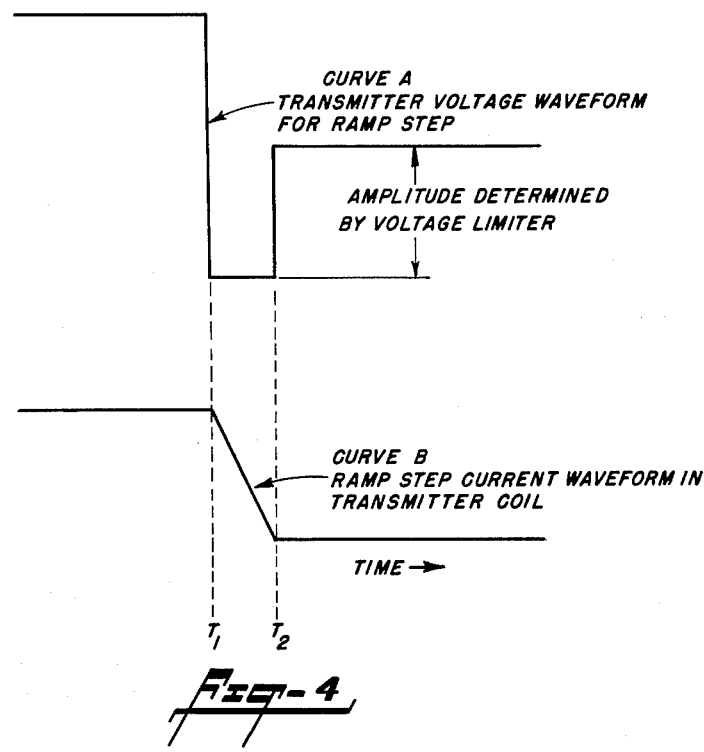

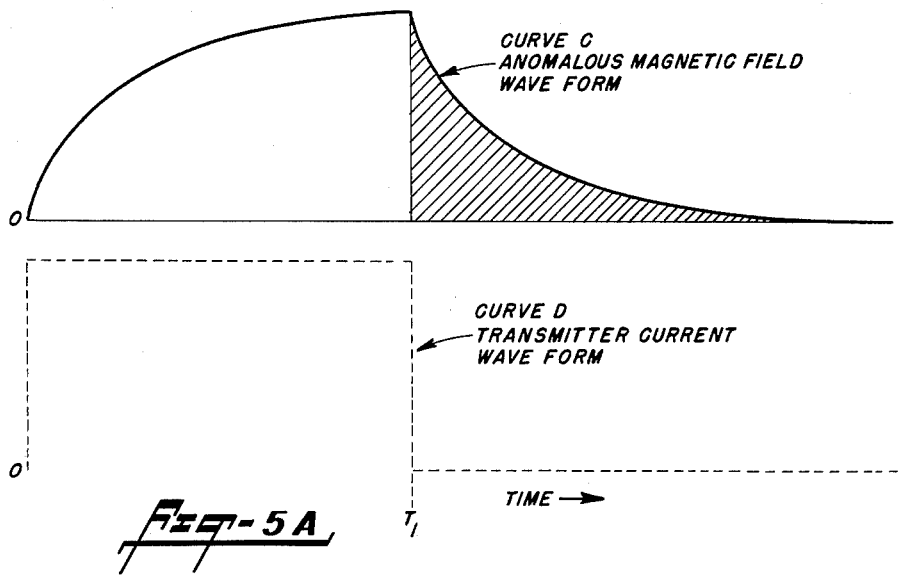
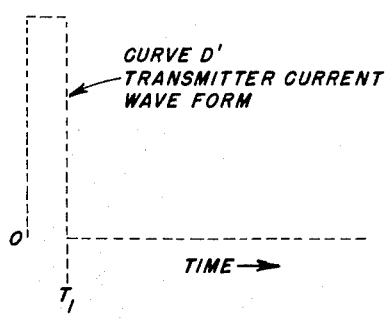
WILLIAM M. DOLAN
GEORGE H. McLAUGHLIN
ARTHUR A. BRANT
INVENTORS

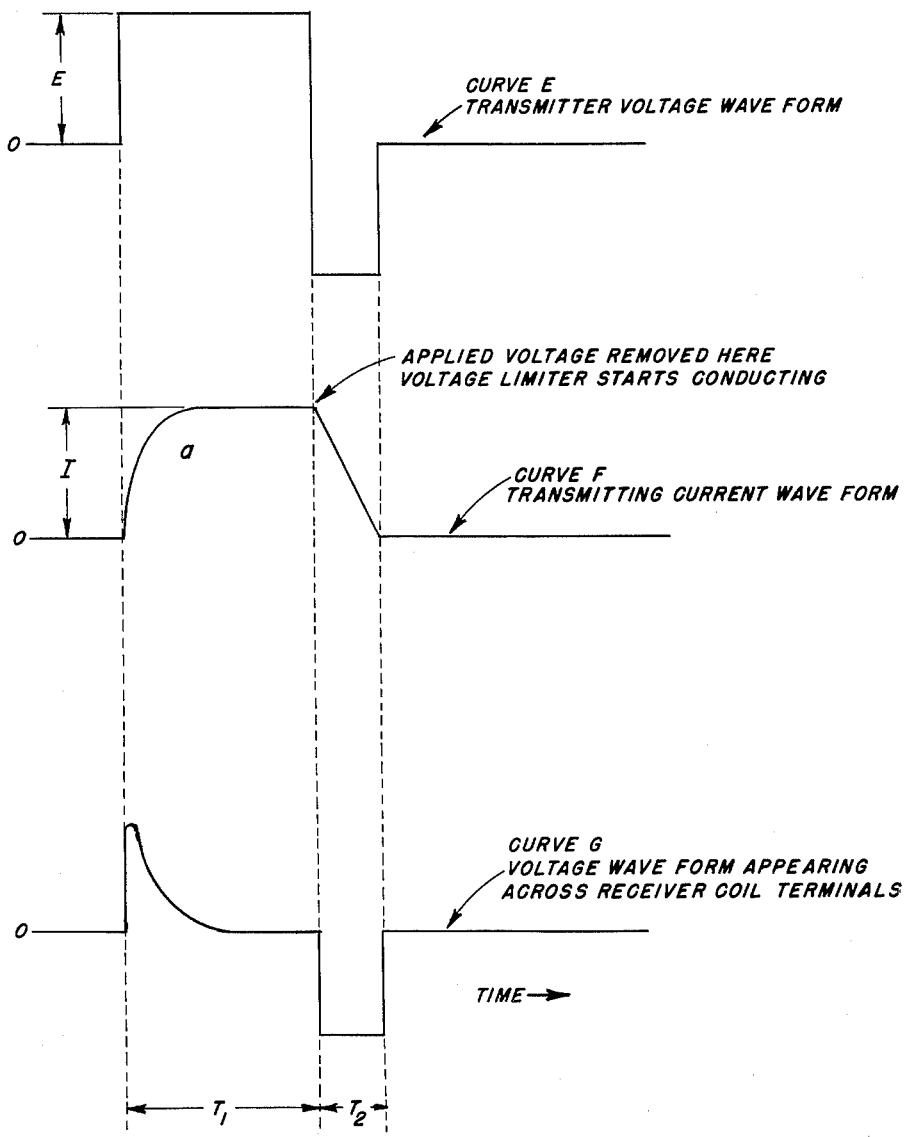

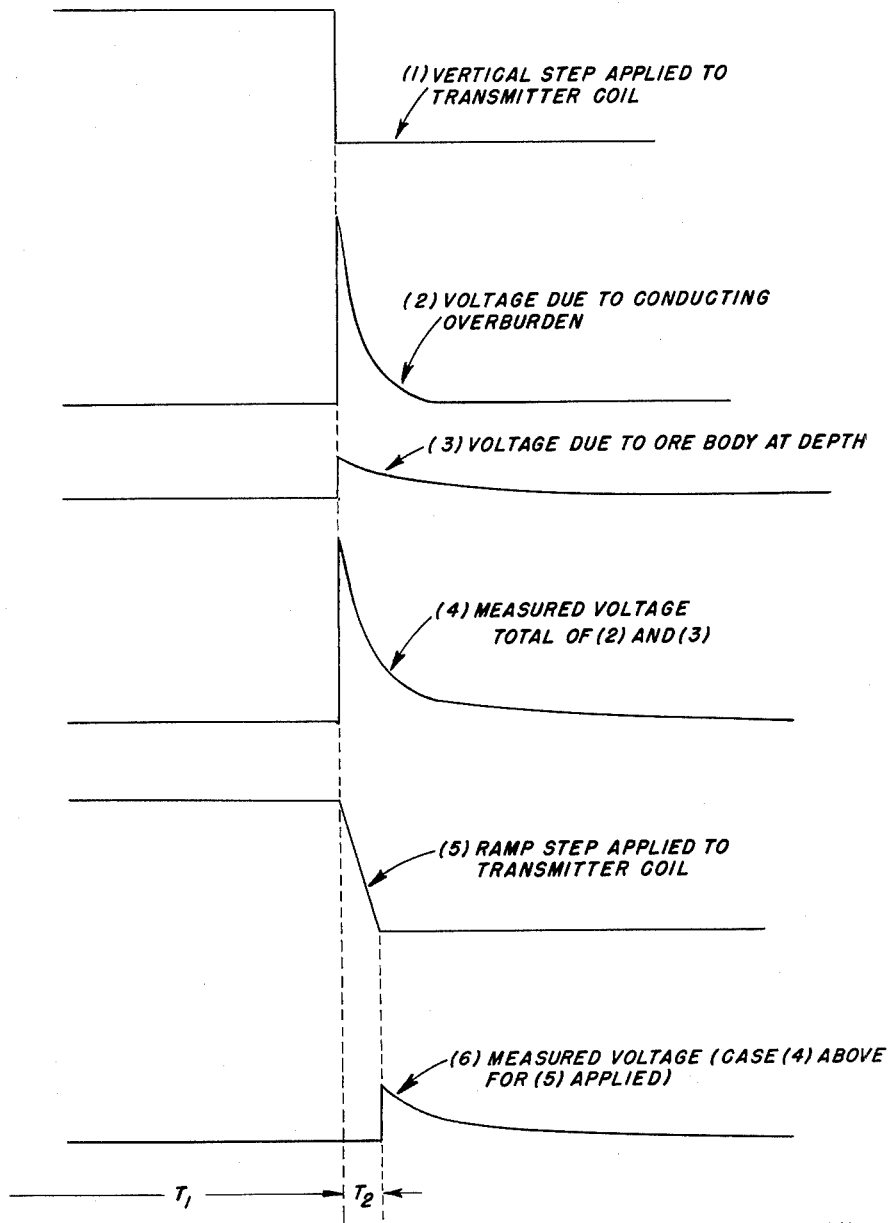

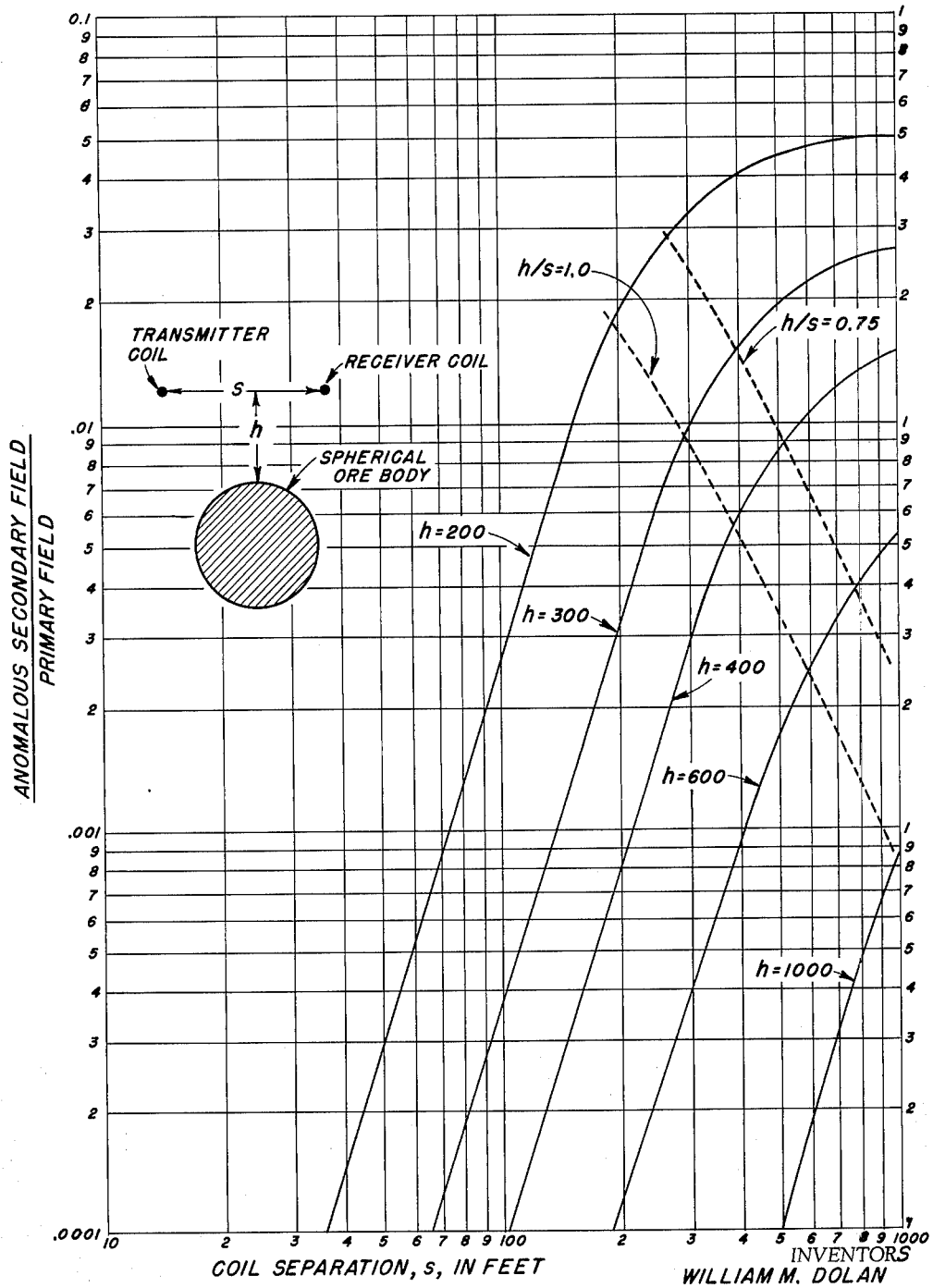

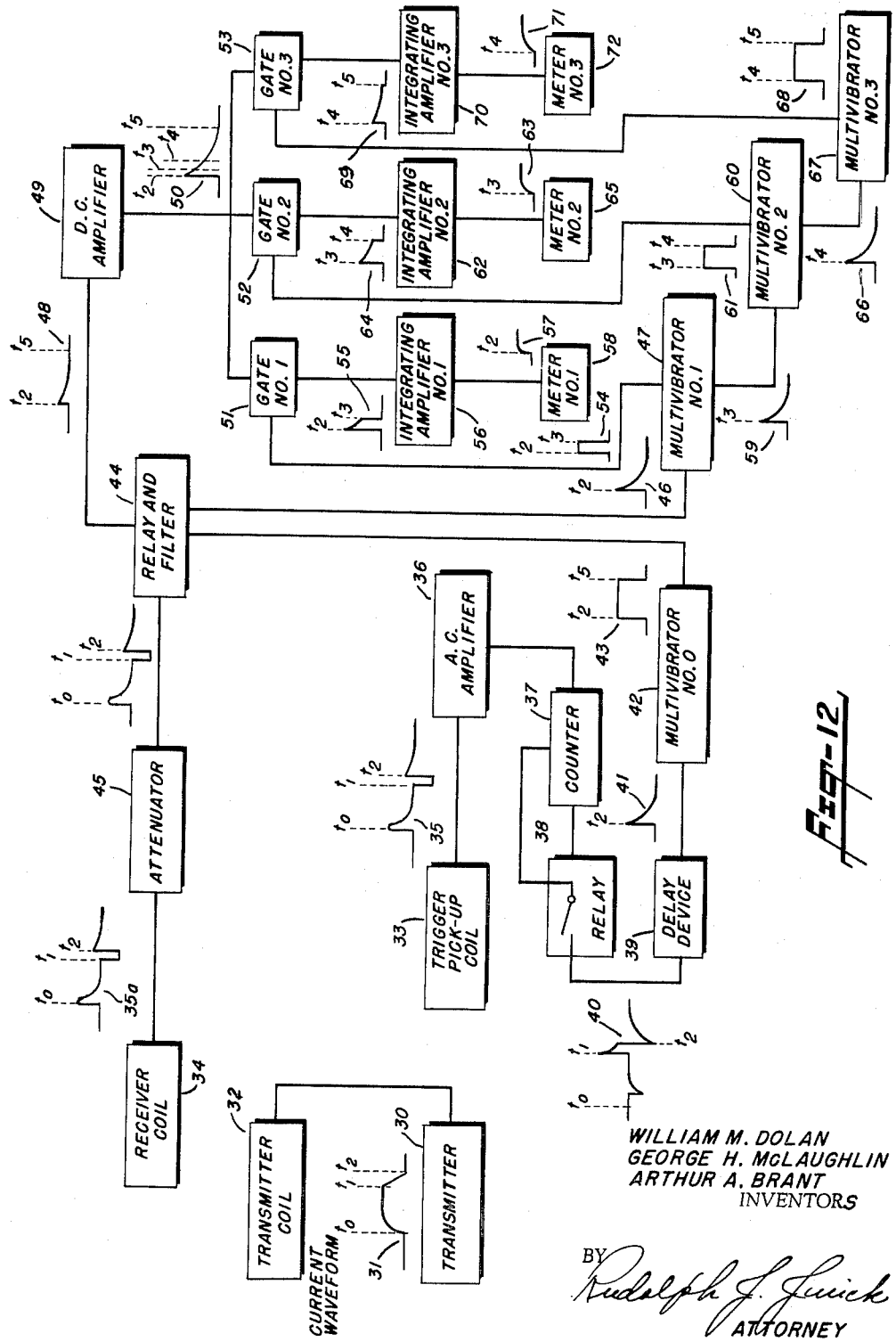

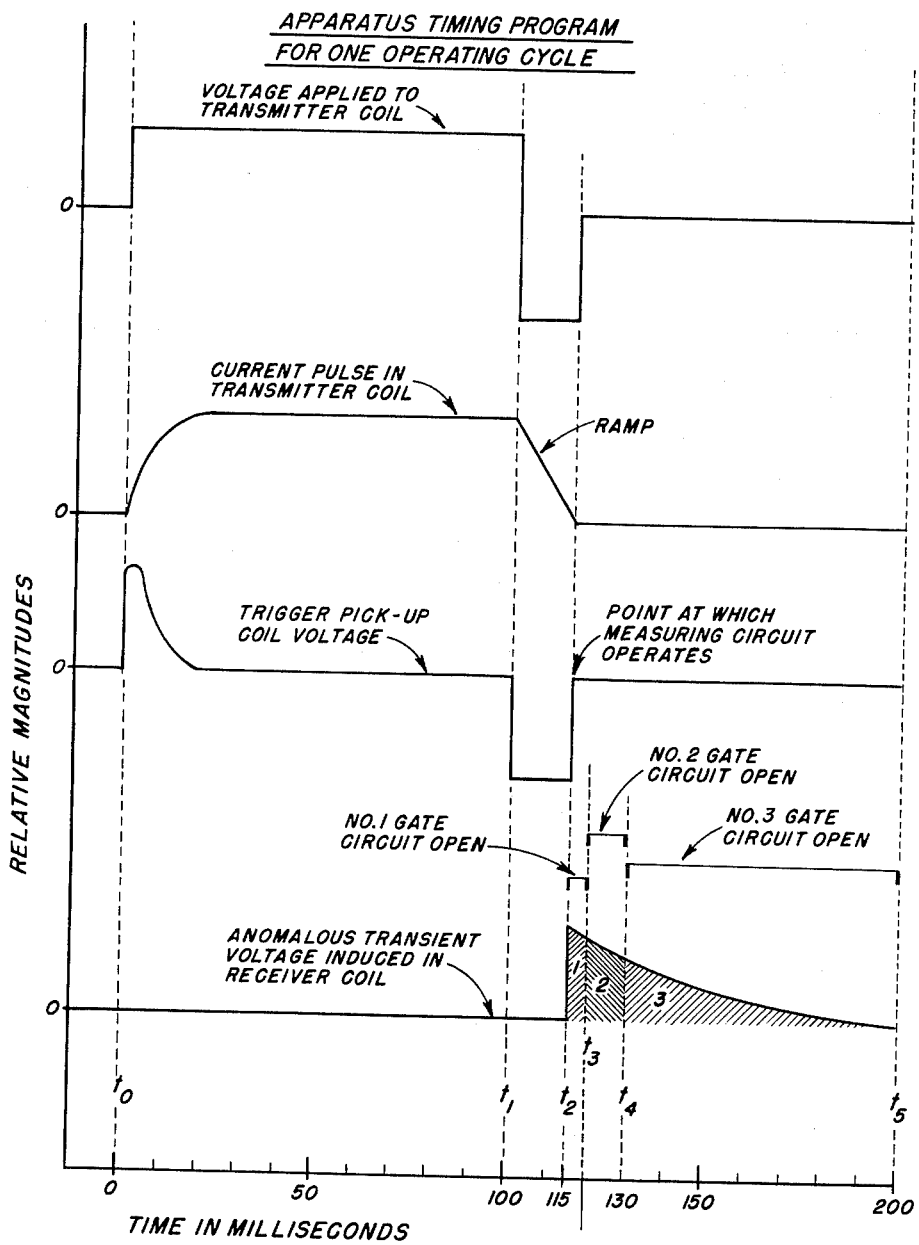

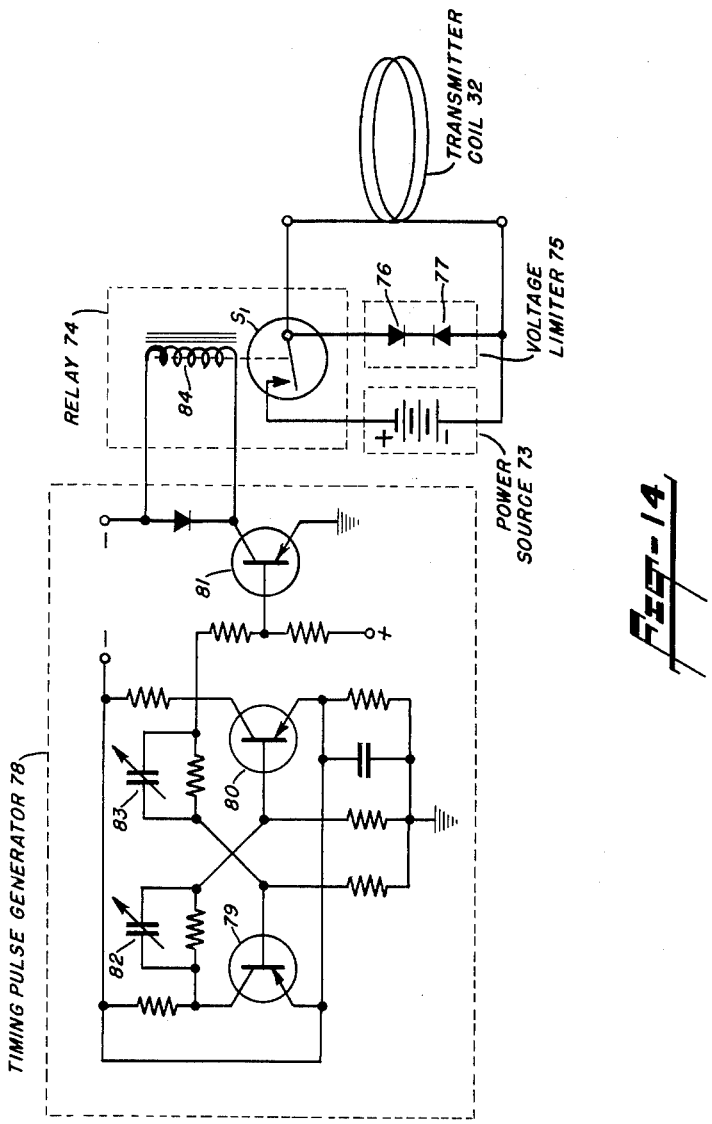

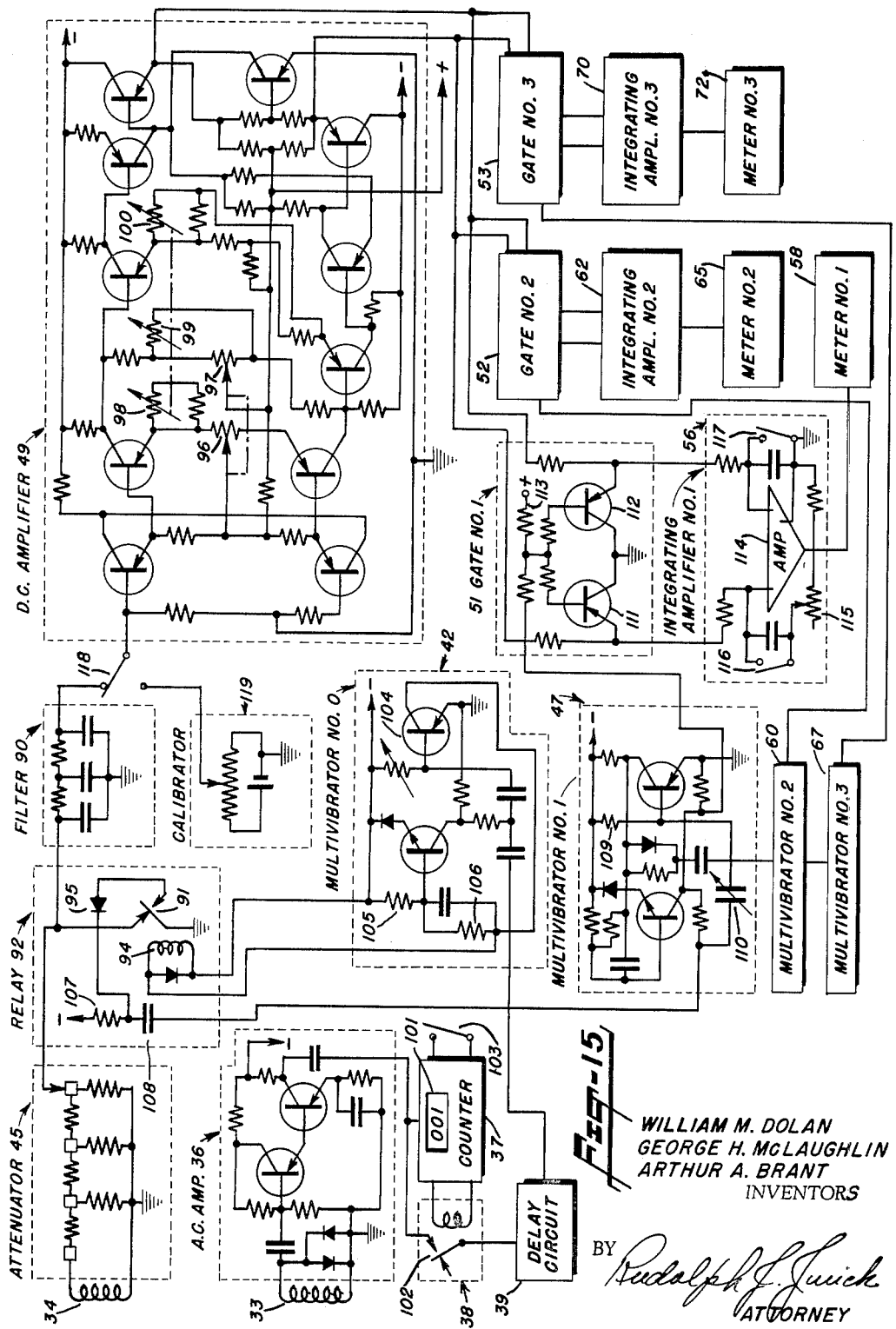

3,263,160
TIME DOMAIN ELECTROMAGNETIC INDUCTION METHOD AND APPARATUS FOR DETECTION OF MASSIVE SULFIDE ORE BODIES UTILIZING PULSES OF ASYMMETRIC WAVEFORM
William M. Dolan and George H. McLaughlin, Danbury, and Arthur A. Brant, Ridgefield, Conn., assignors to Newmont Mining Corporation, New York, N.Y., a corporation of Delaware
Filed Nov. 28, 1962, Ser. No. 240,639
15 Claims. (Cl. 324—6)

This invention relates to geophysical exploration and more particularly to an electromagnetic method for establishing the presence of massive, or interconnected, sulfide ore deposits situated in or beneath an earth overburden, establishing the approximate size, shape and depth of such ore deposits and to apparatus for use in the practice of the method.

Various electromagnetic methods have been developed whereby the presence of sub-surface sulfide ore deposits can be ascertained. In a practical sense, the scope of usefulness of a particular prospecting method depends upon the extent to which certain interfering phenomena can be eliminated or balanced out of the field observations being made over a selected ground region. Extraneous noise is one important factor, particularly since it is desirable that the apparatus employed have a high sensitivity thereby to extend the useful operating range. More importantly, the apparatus and method of its use must positively distinguish between the electromagnetic manifestations arising solely from the ore body and those arising from the overburden.

Generally, the electromagnetic methods of exploration comprise the establishment of a strong magnetic field, through the region under investigation, by passing a heavy charging current through a transmitter coil positioned at the earth's surface. The resulting secondary fields, arising from induced eddy currents flowing in the ore body, are measured by means of a receiver coil and associated apparatus. A series of successive measurements are made, employing various orientations of the transmitter and receiver coils and at various charging current frequencies ranging from 10–1000 cycles per second, the object being to discriminate between a conducting overburden and a better conducting ore deposit.

It has been recognized that the electromagnetic response of sulfide ore deposits varies differently with the frequency of the charging current than does the response of a conducting overburden. Specifically, the ore deposits, where conductivity is of the order of 100 times the conductivity of the surrounding overburden, exhibit a relatively better response at low frequencies (below 100 cycles per second) than the overburden. James R. Wait and Arthur A. Brant, U.S. Patent No. 2,731,596, dated January 17, 1956, propose to separate and evaluate the response of conducting ore deposits in the presence of conducting overburden, having a conductivity of the order of $\frac{1}{100}$ that of the ore deposits, by taking successive measurements at different charging current frequencies. The principles stated by Wait and Brant are valid and useful, but for depths greater than several hundred feet, the power requirements and the complexities of the instrumentation render this method impractical for application under rigorous field conditions encountered in various locations where electromagnetic exploration is practiced.

The inherent disadvantage of an electromagnetic prospecting system operating in the frequency domain (i.e., employing a sinusoidally-varying magnetic field) is that the anomalous or secondary magnetic field must be measured in the presence of the transmitted primary field. One way of attacking the problem is to orient the receiver coil in such a manner that it is not influenced by the transmitted field, specifically, by orienting the axes of the two coils mutually perpendicular to each other. Another method is to maintain the two coils at a fixed separation, but inductively coupled and introducing into the receiver coil, or the circuitry associated therewith, a portion of the transmitter signal in such a manner as to cancel out the voltage induced in the receiver coil directly by the transmitter coil. Thus, when an electromagnetic prospecting system, employing either technique, is traversed over a conducting body, some net signal will be introduced in the receiver. Such signal can be construed to be generated by an anomalous disturbance, providing the initial conditions of coil orientation, separation and/or cancelling component, are held constant. The first method generally is referred to as the null method and the second as the cancellation method. There are numerous variations of both methods employed in present day geophysical exploration.

The null method possesses the inherent advantage of not requiring an electrical connection between the receiver and transmitter and coil separation is not critical to the operation. However, the orientation of the coils is extremely critical. For example, in attempting to resolve anomalies having a strength of about 1% of the primary field, it is necessary to hold the coil orientation to a tolerance of less than one (1) minute of arc.

In the cancellation method, the coil orientation tolerance is not quite so severe, but coil separation must be maintained to considerable precision. Again, in attempting to resolve anomalies of about 1% of the primary field, there can be tolerated no more than 0.01% variation of the primary field incident on the receiver coil. In order to accomplish this, the coil separation tolerance must be held to ±0.003% of the specified coil separation.

Under typical field conditions, on the surface of the ground, such extreme tolerances are all but impossible to maintain, yet, it is essential to be able to resolve anomalies of 0.1% (or less) of the primary field strength if the system is to detect ore bodies at depths of the order of 1,000 feet.

The recognition that the electromagnetic response of a sulfide ore deposit varies differently with the primary magnetic field frequency than does the response of a conducting overburden has lead to the provision of various geophysical exploration systems.

Wait et al. (U.S. Patent No. 2,731,596, dated January 17, 1956) disclose a system wherein the frequency of an alternating current flowing through the transmitter coil is varied.

Wait (U.S. Patent No. 2,735,980, dated February 21, 1956) discloses a primary magnetic field of square wave form having a duration of at least 100 milliseconds.

W. J. Yost (U.S. Patent No. 2,685,058, dated July 27, 1954) describes his source waveform as periodic current pulses of abruptly changing magnitudes.

A. R. Barringer (U.S. Patent No. 3,020,471, dated February 6, 1962) employs a current pulse, in the transmitter coil, which resembles a half-sine waveform having a time duration of two (2) milliseconds and recurring at a rate of about two pulses per second.

The above-referenced prior systems and methods of geophysical exploration each have some level of practical value, but their ranges of usefulness and reliability are limited. Specifically, the prior art methods and apparatus will not detect massive sulfide deposits located 1,000 feet, or more, below a conducting overburden. The reasons for this will become apparent from the detailed description of our invention given hereinbelow.

In many parts of the world, soil and detrital overburden quite frequently have conductivities within the range of 10–100 millimhos/meter. From geological considerations, there is reason to suspect the presence of deep-seated, massive, sulfide ore deposits in many of such localities. Consequently, an electromagnetic system of prospecting, which is capable of detecting, at depths of 1,000 feet or more, sulfide ore deposits (of 5 million tons or more and having a conductivity of 1–1,000 mhos/meter) under overburden of conductivity 10–100 millimhos/meter, can be of immense value. The method and apparatus to be described in detail, hereinbelow, meets these requirements.

Briefly, our new method of geophysical exploration comprises the establishment of a powerful static magnetic field within the region under investigation, terminating the magnetic field, not abruptly, but at a linear rate and subsequently measuring the resulting secondary, or anomalous, electromagnetic transient fields induced in the ore body. The primary magnetic field has a predetermined time duration and the secondary magnetic fields are measured in a specific manner and within specified time domains. By judicious choice of the orientation and separation of the transmitter coil (primary field source) and the receiver coil, as well as the shape of the charging current waveform, the electromagnetic transient response (resulting from induced eddy currents in the ore body) of a large, interconnected sulfide deposit of 1–1,000 mhos/meter conductivity and situated at depths of 1,000 feet, can effectively be detected in the presence of the relatively large and heretofore blanketing response of overburden having a conductivity between 10–100 millimhos/meter. The transmitter and receiver coils are located at, or slightly above, the surface of the earth during the measurement period. The application of the charging current pulse to a transmitter coil situated on the surface of the earth and the measurement of the induced transient magnetic field subsequent to the termination of the current pulse affords an enormous practical advantage, namely, the anomalous signal is not measured in the presence of the primary magnetic field, thus obviating the need for maintaining rigid spacial relationships between the coils as they are traversed along the ground. In addition to establishing the presence of a massive, deep-seated sulfide ore body, the method and apparatus affords a determination of the approximate shape of the ore body, its conductivity and the approximate depth thereof.

An object of this invention is the provision of an electromagnetic method and apparatus for detecting the presence of a massive sulfide ore body disposed at a depth beyond the effective detection range of methods and apparatus heretofore available.

An object of this invention is the provision of an electromagnetic method of detecting the presence of, and establishing the approximate size and depth of, a massive sulfide ore deposit situated in or beneath conducting overburden.

An object of this invention is the provision of a method of detecting the presence of a sub-surface massive sulfide ore deposit, which method comprises establishing a magnetic field in the region under investigation by passing current pulses of a predetermined waveform through a coil situated at the earth's surface, terminating the current pulses at a linear rate, and determining the time integral of the resultant voltage induced in a receiver coil by the transient magnetic field present after termination of the current pulse.

An object of this invention is the provision of a method of geophysical exploration comprising establishing a magnetic field of negative ramp step waveform through a region under investigation, measuring the resultant transient voltage induced in a receiver coil following termination of the magnetic field, and integrating the resultant transient voltage over preselected time intervals.

An object of this invention is the provision of a method and apparatus for detecting the presence of a massive sulfide ore deposit having a conductivity in the range of 1–1,000 mhos/meter and situated at a depth of 1,000 feet or more, in or beneath overburden having a conductivity in the range of 10–100 millimhos/meter.

An object of this invention is the provision of apparatus for geophysical exploration comprising transmitter and receiver coils, means for establishing current pulses of predetermined waveform and time duration in the transmitter coil, and means for integrating over predetermined time periods the resultant transient voltage appearing across the receiver coil after termination of the said current pulses.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is a set of curves showing the anomalous field response plotted against primary field frequency for a massive ore body (of about 5 million tons) having a conductivity of about 100 mhos/meter and situated about 1,000 feet beneath the surface of a conducting earth having an average conductivity of about 10 millimhos/meter;

FIGURE 3 is a schematic circuit diagram of the transmitter made in accordance with our invention;

FIGURE 4 is a set of curves showing the voltage and current waveforms obtained from the FIGURE 3 arrangement;

FIGURES 5A and 5B are related curves showing the anomalous magnetic field waveforms for square wave charging currents of two different time durations;

FIGURE 6 shows the transmitter voltage and current waveforms as used in the practice of this invention, together with the resultant receiver voltage waveform, in the absence of conducting material;

FIGURE 7 shows the receiver waveforms, when a conducting ore body is present, for two different transmitter waveforms;

FIGURE 8 is a plot showing the relative response of an ore body for various separations of the transmitter and receiver coils;

FIGURE 12 is a block diagram of the apparatus used in the practice of our invention;

FIGURE 13 illustrates the timing program of the apparatus for one operating cycle;

FIGURE 14 is a schematic circuit diagram of the transmitter; and

FIGURE 15 is a schematic circuit diagram of those components of the receiver circuit which are not duplicated in the three measuring channels.

Figure 1:
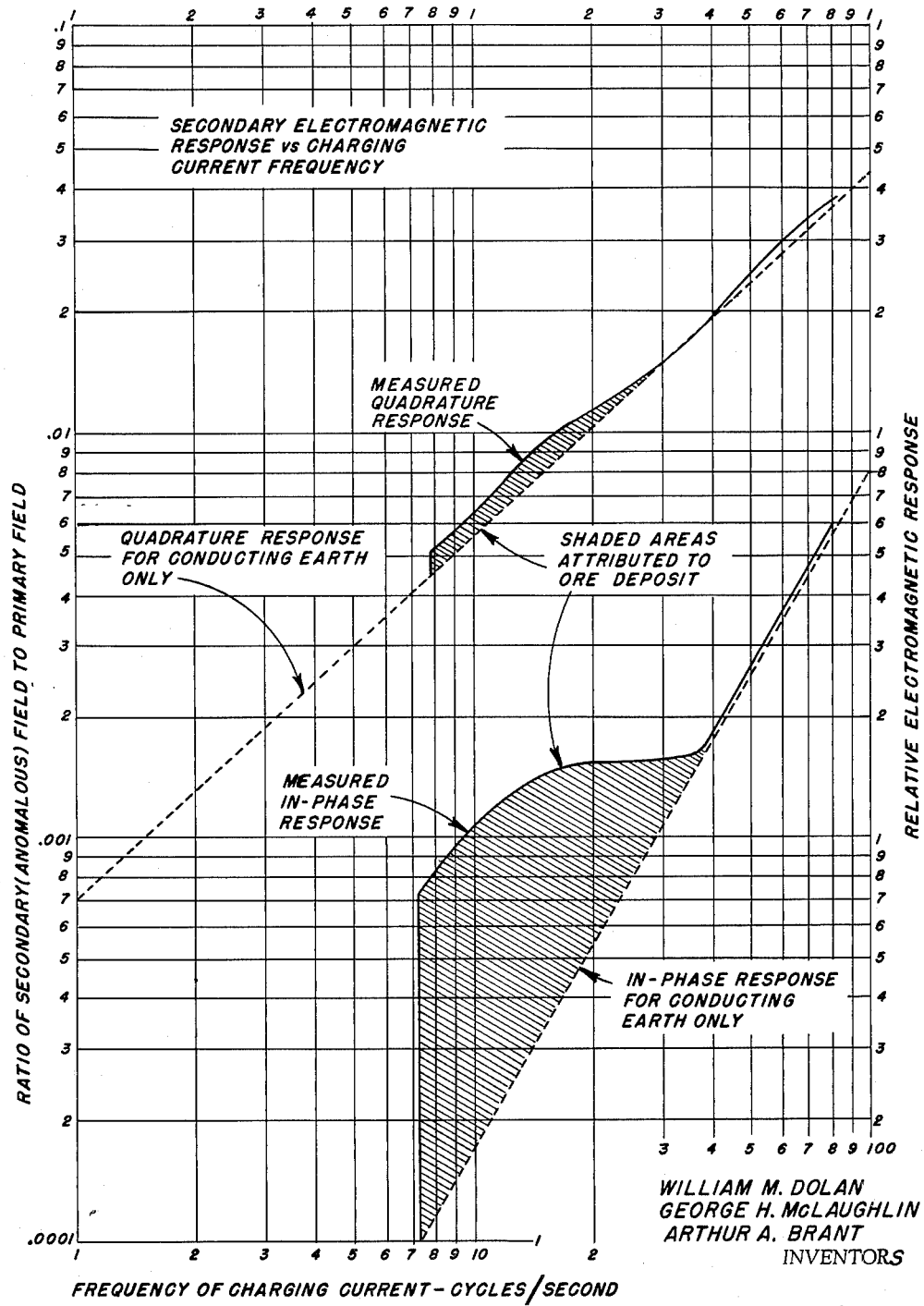

Reference, now, is made to FIGURE 1, which illustrates an actual case of a 5 million ton ore body of roughly spherical dimensions, conductivity of approximately 100 mhos/meter, and situated approximately 1,000 feet beneath the surface of a conducting earth having an average conductivity of approximately 10 millimhos/meter. The complex, in phase and quadrature, electromagnetic response of the ore body is plotted (on a log-log scale) as a function of the frequency of the primary magnetic field passing through the ore body and established by passing an alternating charging current through a large coil disposed on the earth's surface. The ore body response is seen to become discernible on the in-phase plot and to a lesser extent, proportionally, on the quadrature plot, at charging current frequencies below about 30 cycles per second. It will be apparent that the system necessary to detect the ore body should have an operating frequency range beween 5 and 50 cycles per second. Further, in order to provide a sufficient signal level in the receiver system, above extraneous and spurious noise levels, the development of the necessary magnetic field requires a transmitter system of inordinate size and weight, it being apparent that the effective primary magnetic field strength is governed by the product NIA, where;

N is the number of turns of the transmitter coil;
I is the magnitude of the charging current flowing in the coil; and
A is the coil area.

Consequently, a system of exploration operating in the frequency domain, for the condition under discussion, would weigh several thousand pounds and would be employable only under the most ideal conditions, which conditions seldom are encountered in the field.

The behavior of an electrical system in the time domain, i.e., the application of an electrical pulse, of step form, is directly related to its behavior in the frequency domain. The termination of a square wave pulse, having sufficient duration for the establishment of magnetic quiescence in all attendant media, corresponds to the application of a negative step, a step being defined as a signal having a zero value prior to time zero and being equal to some constant positive value for all times greater than zero. The relationship between the behavior of an electrical system in the time domain and the frequency domain can be determined through application of the Laplace transform. For example, a convenient approach to obtaining the response of a system to a unit step when the frequency response is known is as follows:

$$A(t) = 2/\pi \int_0^\infty B(w)/w \cos wt \, dw \quad (1)$$

where:
$A(t)$ = the step mutual impedance, synonymous with output/input,
$B(w)$ = quadrature component of the frequency mutual impedance of the system,
$w = 2\pi$ times the frequency, and
$t$ = time.

For electromagnetic prospecting cases, $B(w)$ generally only has significant values below 5,000 cycles per second. Furthermore, it is relatively simple to obtain approximate plots of $B(w)$ by scale model measurements. The above equation may then be employed graphically to obtain approximate plots of $A(t)$ for the given anomalous condition. The value $A(t)$ may also be obtained directly by transient scale model measurements.

The anomalous transient voltages, $A(t)$, occurring in a search (receiver) coil after the flow of transmitter coil current has been terminated, exhibit approximately an exponential decrease in prospecting cases. The response on the transient decay curve, at increasing time, corresponds to the response at decreasing applied frequency. In this regard, it is pertinent to examine the frequency distribution of various possible transmitter waveforms. This may be done by employing the well known Fourier integral transform.

Figure 2:
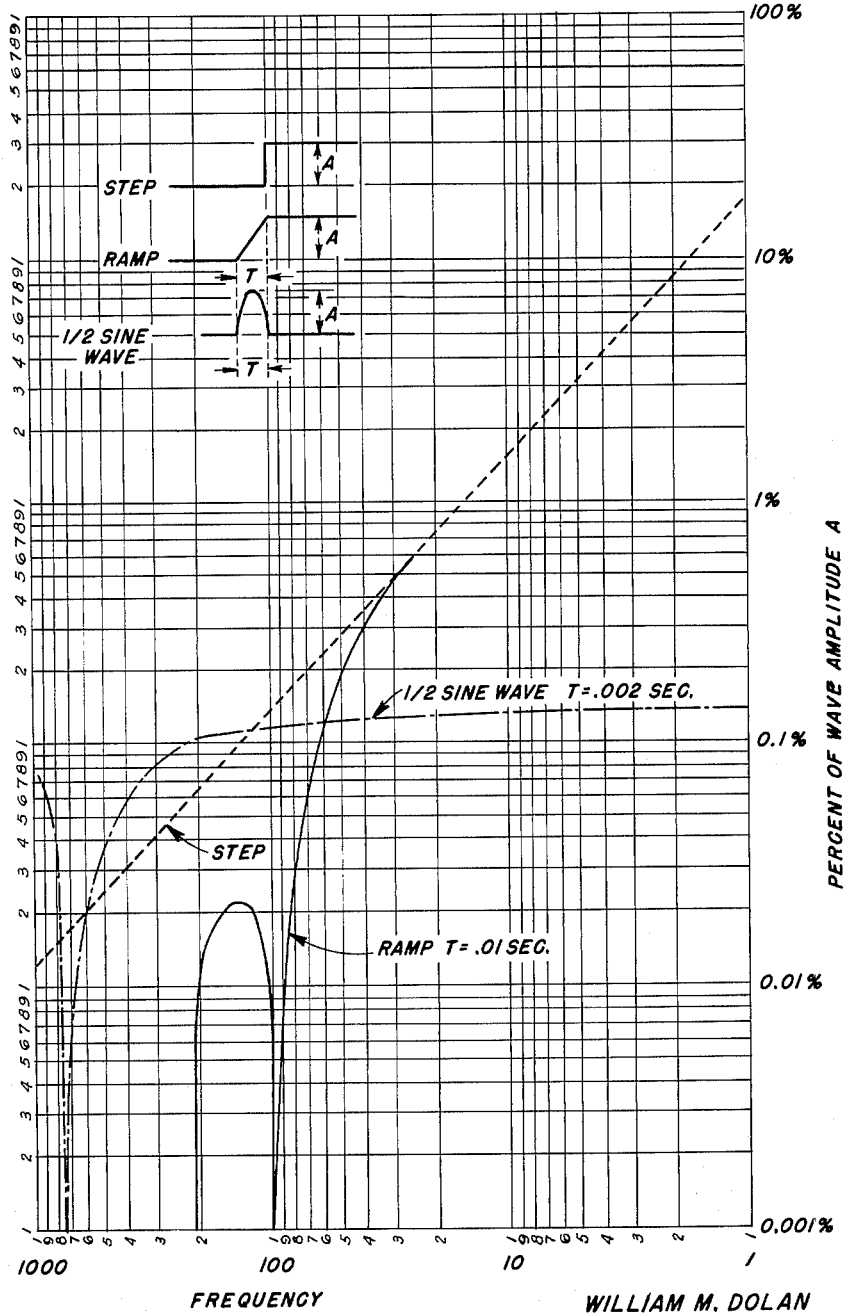
FIGURE 2 is a set of curves showing the frequency distribution of current pulses of various waveforms.

Reference, now, is made to FIGURE 2 which illustrates a comparison between the frequency distribution of a step wave, a half-sine wave of two milliseconds duration and a ramp step wave having a 10 millisecond rise time. It is here pointed out that a ramp step is defined as a step having a finite rise time. The independent variable is frequency and the dependent variable (ordinate) is percent of the pulse amplitude A, as shown in the waveform sketches applied to FIGURE 2. Thus, the comparison between the three waveforms is relative. Recalling from FIGURE 1 that the response of an ore body is discernible in the presence of conducting overburden only below about 30 cycles per second, it is apparent that it is desirable to employ a charging current waveform having its energy concentrated in a frequency region of about 5–50 cycles per second. It is apparent from the curves of FIGURE 2 that this is more true of a ramp step than the vertical step, and not at all true of the 2 millisecond half sine wave pulse. It is further apparent that the half sine wave pulse has a nearly uniform frequency distribution from 0–500 cycles per second, with comparative amplitude about 100 times less than either of the other two waveforms at 1 cycle per second. Thus, both the vertical step and the ramp step waveforms have much greater energy fractions confined to the desirable low frequency regions (less than 30 cycles per second) than does the half-sine wave of two milliseconds duration. Also, it will be noted that the ramp step better achieves this desired goal than even the vertical step. Obviously, then, a half sine wave of short duration has its energy spread over a wide range of frequencies, the higher frequencies resulting in unwanted transient voltages arising from the overburden.

We conclude, therefore, that by employing a charging current of ramp step waveform in the transmitter coil, with a rise time of the order of 10 milliseconds, that portion of the anomalous transient decay curve corresponding to the relatively high frequency overburden response, is suppressed thereby leaving, for measurement purposes, the transient voltage arising from the ore body.

It should further be noted that a vertical current step (zero rise time) applied to a coil is difficult to realize. The technique would be to instantaneously remove the applied power from the transmitter coil. However, the energy, E, stored in the magnetic field generated by the coil is expressed by the equation;

$$E = \tfrac{1}{2} LI^2$$

where:
$L$ = the coil inductance, and
$I$ = the current flowing in the coil.

This energy would manifest itself as a voltage of extreme magnitude across the coil terminals. Where the factors L and I are large (say, $I = 1{,}000$ amperes and $L = 10$ millihenries), this results in insurmountable problems with regard to coil insulation and switching.

It is, however, relatively simple to achieve a ramp step current waveform with an inductive load.

Referring to FIGURE 3, if a voltage limiter 10 is placed across the transmitter coil 11 and such voltage limiter is arranged to be conductive at a voltage somewhat higher than the output voltage of the power source 12, but less than the breakdown voltage of the coil insulation, the energy in the coil will be dissipated over a finite length of time. The resulting voltage waveform A and current waveform B are shown in FIGURE 4, it being assumed that the switch $S_1$ (FIGURE 3) opens at the time $t_1$. The ramp duration of the current waveform is adjustable by controlling the conduction limit of the voltage limiter but it is not normally varied once the design factors of the particular transmitter system have been established. In general, we have found that a ramp duration time of 2–15 milliseconds is satisfactory for our purposes. A higher ramp duration time results in a reduction in the relative amplitude of the frequencies of interest, namely, 5–50 cycles per second.

For optimum operation, the transmitter current should remain on for a time period long enough so that its termination is equivalent to the application of a negative step. Taking a square wave for illustration, the leading, vertical edge of the wave constitutes the application of a positive step. If the duration of a square wave is not sufficient to allow the transients induced in the surrounding conductor (by the leading edge of the wave) to decay completely, that is, for magnetic quiescence to be achieved in the surrounding media as well as the coil, the termination of such square wave will not constitute the application of a negative step. This principle is illustrated in FIGURES 5A and 5B. In FIGURE 5A, the curve D represents the square wave current pulse in the transmitter, such pulse having a sufficient time duration so that the resulting magnetic field reaches an asymptotic level. Upon termination of the wave, at time $t_1$, the anomalous magnetic field has a waveform as shown by the curve C. In FIGURE 5B, the curve D' represents a transmitter current of square waveform having the same amplitude as the curve D in FIGURE 5A but a much shorter time duration. In such case, the waveform of the anomalous magnetic field is shown by the curve C'. It is apparent that the attenuation of the anomaly in the case of FIGURE 5B is severe. Similar desiderata apply to a ramp step waveform. We have found that the time duration of the ramp step current waveform of the transmitter should be approximately 100 milliseconds to assure the application of a negative ramp step upon termination of the current pulse.

Reference, now, is made to FIGURE 6, which illustrates the current waveforms employed in the practice of our invention (for a non-anomalous case) and the waveform of the resultant voltage induced in the receiver coil. The voltage pulse applied to the transmitter coil (curve E) has an amplitude, E, and a time duration $(t_1)$ of about 100 milliseconds. The transmitter current waveform (curve F) has a maximum amplitude I, which equals $E/R$, where R is the resistance of the transmitter coil. The wavefront, a, of the transmitter current pulse is defined by;

$$I = \frac{E}{R}\left[1 - e^{-\left(\frac{tR}{L}\right)}\right]$$

where:

$e = 2.7183 =$ Naperian log base
$t =$ time, and
$L =$ inductance of transmitter coil.

Upon termination of the voltage pulse to the transmitter coil (end of time duration $t_1$) the voltage limiter starts conducting (see, also, FIGURE 3) whereby the back E.M.F., induced by the decaying magnetic field in the transmitter coil, results in a linear decay (negative ramp step) of the transmitter current pulse within a time period $t_2$. It is here pointed out that the receiver coil effectively is disconnected from the measuring circuit (by appropriate means to be described hereinbelow) during the entire time the current pulse flows in the transmitter coil, specifically, until the end of the time duration $$t_1 + t_2$$

Thus, although the waveform of the voltage induced in the secondary coil, as a result of the primary magnetic field, appears as shown in curve G, the voltage measured is zero, it being again pointed out that the curves of FIGURE 6 represent a condition wherein a conducting ore body is not present.

The relative anomaly response of two systems, namely, one operating on the square wave principle in accordance with the prior art and the other operating on the ramp step principle in accordance to this invention, is illustrated in FIGURE 7. The magnetic waveform resulting from a vertical step (square wave) applied to the transmitter coil, curve 1, is applied to a conducting earth having a conductivity of 10 millimhos/meter. The resultant voltage induced in the receiver coil, due to such conducting overburden, is shown in curve 2. When this vertical step magnetic waveform, curve 1, is applied to a 5 million ton ore body located 1,000 feet below the earth's surface and having a conductivity of 10 mhos/meter, the resultant voltage arising therefrom is represented by curve 3. Inasmuch as the two resultant voltages, curves 2 and 3, exist simultaneously, the sum thereof, as shown in curve 4 appears in the measuring circuit. Although the individual voltage waveforms, curves 2 and 3, have different decay time constants, such difference is relatively small. More importantly, the magnitude of voltage due to the overburden is substantially greater than that due to the ore body, for two reasons, namely, (1) the relative distance of the overburden and the deep-seated ore body from the transmitter coil, and, (2) the high frequency components included within the square wave current pulse and to which the overburden is predominantly responsive as contrasted to the response of the ore body to frequencies within 5–50 cycles per second. The problem of segregating the two responses to the degree of certainty required to justify mining operations is apparent. In contrast, by applying a current pulse of ramp step waveform to the transmitter coil, curve 5, to the same combination, the total resultant voltage appearing in the receiver coil has the waveform of curve 6. It will be seen that in this case, the overburden response is all but absent whereas the ore body response is not appreciably modified. The substantial absence of overburden response is due to the absence of the higher frequency components, above 50 cycles per second, in the ramp step wave.

As stated hereinabove, an obvious virtue of the transient electromagnetic technique lies in the fact that the anomalous secondary response need not be measured in the presence of the transmitted primary field. This permits separation of the ore body response from overburden response when these factors are not otherwise separable. Thus, as shown in curve 6 of FIGURE 7, the measurement of the voltage developed in the receiver coil at the end of the time period $t_1 + t_2$ intrinsically eliminates from consideration the major portion of overburden response, even though the maximum value of such overburden response is very much smaller than in the case of the vertical step, square wave, excitation system.

When the overburden is of a uniform nature and has a response with notably less time constant than that of the ore body, the two responses are easily separable by direct observation of the response curve in accordance with our invention. However, it is common to encounter a case where the overburden is of irregular thickness and conductivity and the ore body conductivity is barely two orders of magnitude above the conductivity of appreciable portions of the overburden. Specifically, the ore body conductivity may be 10 mhos/meter and the conductivity of a major portion of the overburden may be 100 millimhos/meter. In such case, the character of the transient decay curve does not directly indicate the presence of an ore body. Nevertheless, by traversing the anomalies again at successively different coil separations, we have found it possible to uniquely determine whether the anomalies are attributable to overburden or to a deep, discretely-bounded conductor, such as an ore deposit.

FIGURE 8 is a plot of the electromagnetic response arising from a spherical subsurface ore body for various separations of the transmitter and receiver coils. The frequency of the current in the transmitter coil is held constant at 10 cycles per second and the conductivity of the spherical ore body is 10 mhos/meter. The independent variable is coil separation, $s$, in feet and the depth of the ore body below the earth's surface in feet is designated by the letter $h$. It will be noted that for values of $s$ (coil separation) such that the ratio $h/s$ is greater than 1.0, the response increases proportional to $s^3$. Since the response parameter (ordinate in FIGURE 8) is the ratio of the anomalous secondary field at the receiver coil to the direct primary field at the receiver coil, we would expect this to be true only if the absolute anomalous secondary field remained constant. This is because the primary field at the receiver increases proportionally to the factor $1/s^3$. Thus, it is indicated that for $h/s$ greater than 1.0, the absolute anomalous signal remains essentially constant. Actually, we have found that where $h/d = 2$ ($d$ being the diameter of the ore body) and $0 < s/h < 1.0$, the absolute anomalous response remains substantially constant, when the primary field frequency and the ore body conductivity are constant. Inasmuch as the transient response is directly related to the frequency response, we may thus infer that for deep-seated ore bodies (spherical, spheroidal or lens-like in shape) we may vary the coil separation such that $0 < s/h < 1.0$ and the secondary response will remain essentially constant.

Figure 9:
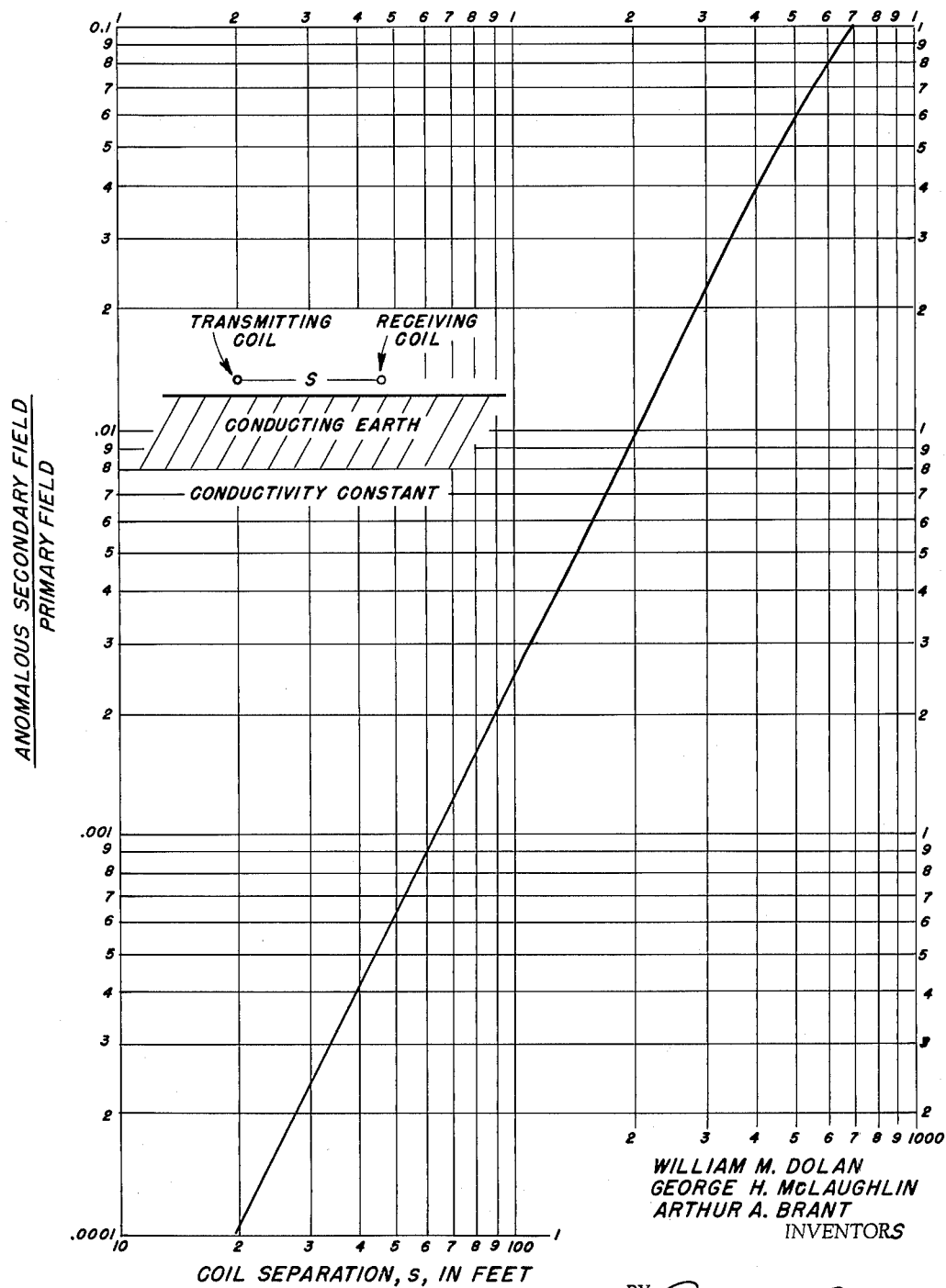
FIGURE 9 shows the response of conducting earth for various separations of the transmitter and receiver coils.

Referring, now, to FIGURE 9, there is shown a similar plot for the same two coils on the surface of a conducting earth, conductivity and primary field frequency being held constant at 100 millimhos/meter and 10 cycles per second, respectively. Examination of this plot indicates that the overburden response varies approximately as $s^2$. Therefore, the absolute overburden response is seen to increase approximately proportional to $s$ and this same property will be exhibited in the time domain. Hence, by varying the coil separation, which is easily done in a transient case, it will become apparent whether an anomaly is due to an overburden variation or to a discrete conducting ore body disposed at a substantial depth below the earth's surface.

As an example of application, a series of reconnaissance traverses are first made over a certain area with a constant coil separation of 1,000 feet. A direct examination of the response decay curves, at each measurement station, suggests one or more anomalies as possibly attributed to deep-seated, good conductors but the results are not conclusive. Now, if these anomalies of interest are again traversed with a coil separation of, say, 250 feet, and are not attenuated by about a factor of 4, it can conclusively be taken that the anomalies are due to something other than overburden, e.g., a sulfide ore deposit.

As compared to frequency electromagnetic prospecting techniques, the transient electromagnetic prospecting technique has the disadvantage that a broad band (about 0–50 cycles per second) input circuit is necessary for the receiver system. Thus, the signal to noise ratio cannot be enhanced by filtration, as in the frequency system. In accordance with our invention, the approach to the problem is to integrate with respect to time, selected portions of the response decay curve over several cycles of measurement. Actually, we prefer to integrate three different portions of the decay curve. Specifically, a first integrating channel is effective over a time period of 0–5 milliseconds, where 0 time corresponds to the time when the ramp step transmitter current completely terminates, a second integrating channel is effective over a time period 5–15 milliseconds, and a third integrating channel is effective over a time period 15–100 milliseconds. Dividing the results by the number of cycles integrated gives the average integral in each instance. A filter having a 0–50 cycle per second pass band is incorporated in the receiver system. Random noise having frequency components within the 0–50 cycle pass band can be expected to have an average integral of zero (0) over several minutes. Consequently, by utilizing an averaging time of several minutes, we eliminate the effects of such noise whereby the integrated values correspond only to the desired transient response. Other spurious signals, such as may arise from power line fields, usually are periodic and their average integral over a period of several minutes is zero. Further, the 0–50 cycle pass band generally is too low to be disturbed by other disturbance, such as radio transmissions.

Figure 10:
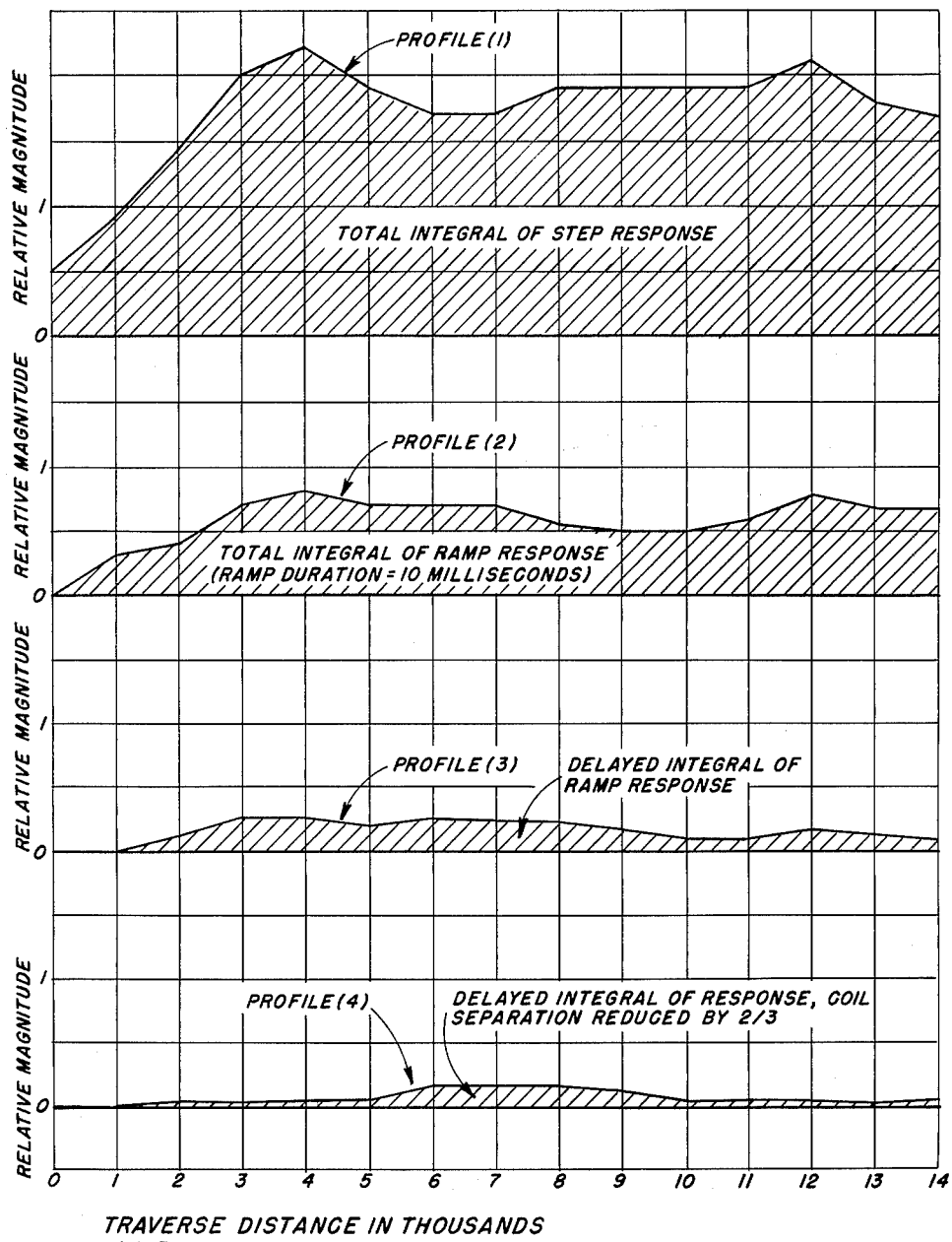
FIGURE 10 is a series of time-related profile plots showing the relative time integrals of the transient secondary responses obtained under scale model conditions.

FIGURE 10 demonstrates the application of the principles discussed to this point. The curves are profile plots of transient scale model results taken over a highly irregular overburden (that is, irregular conductivity and thickness) with an ore body situated at a depth corresponding to 1,000 feet beneath the surface. The ore body corresponds to a 5 million ton mass having a conductivity of 10 mhos/meter and the corresponding overburden conductivity varies between 10 and 100 millimhos/meter. In profiles 1 through 3, the separation between the transmitter and receiver coils is 1,000 feet, full scale, whereas the coil separation in profile 4 is 330 feet. Profile 1 is the time integral of the transient, secondary response for a step current waveform in the transmitter coil, such step waveform being readily achieved in a model. In profile 2 the same traverse is made, but the transmitted waveform corresponds to a ramp step of 10 milliseconds ramp duration. It will be noted that the integral of the response curve in profile 2 is appreciably less than in the profile 1 case, this being due to the absence of the higher frequency components in the ramp step waveform and which components have little effect upon the ore response but considerable effect on the overburden response. Also, the ore body response in profile 2 is not discernible any more than it is in profile 1. This is occasioned by the fact that in both profiles, 1 and 2, the secondary response has been integrated over a time period of 100 milliseconds, starting from the moment the current pulse in the transmitter coil is completely terminated. In profile 3, the integral of the ramp step response from 15 to 100 milliseconds is plotted, zero time corresponding again, to the complete termination of current flow in the transmitter coil. Even here (profile 3), the results are not clearly indicative of the presence of the ore body. However, when the coil spacing is reduced to 330 feet, the resulting profile 4, wherein, again, the measured quantity is the time integral between 15 and 100 milliseconds, is seen to have about ⅓ the amplitude of profile 3 except for the region between the 5 and 10 along the profile. Such response within the 5 and 10 region is, essentially, the response of the ore body.

The data presented thus far has been obtained with a null type coil array, namely, where the axis of one coil is horizontal and the other coil has a vertical axis and is located along the axis of the first coil. The sensitivity of such system to conducting overburden is not high. However, the coil orientations, relative to each other, are not critical in the practice of our invention since it is not necessary to measure the anomalous signal in the presence of the transmitted, primary signal. This freedom of coil orientation affords other advantages.

Figure 11:
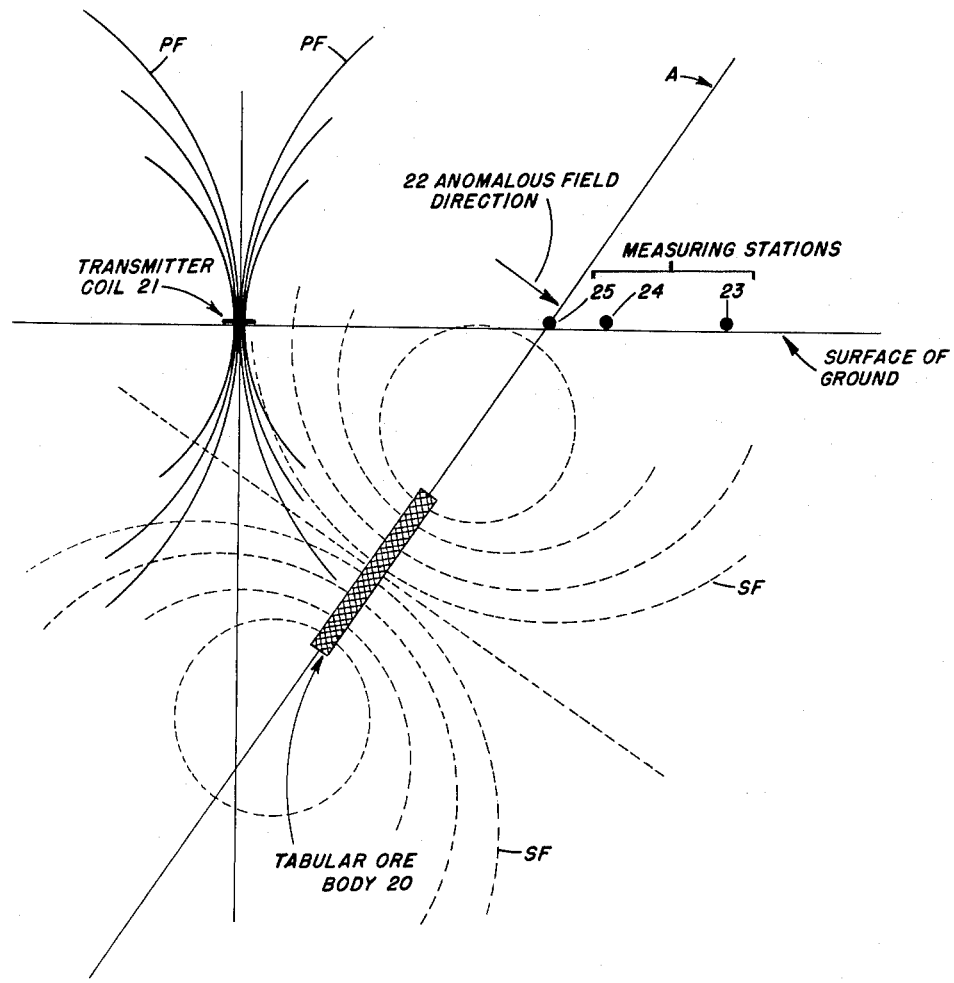
FIGURE 11 illustrates the coil orientation for establishing the attitude of a dipping tabular ore body.

When ore bodies of tabular shape are encountered (any inclination) in conducting surroundings, it is advantageous to employ other coil orientations in conjunction with the mentioned, mutually-perpendicular orientation. FIGURE 11 is a vertical section illustrating the case of a vertically-oriented, primary magnetic field, PF, incident on a dipping, tabular ore body 20. Such field is developed by current flowing in a transmitter coil 21 lying in the plane of the ground surface. The resulting secondary (anomalous) field is indicated by the dashed lines SF. Along the axial plane A, of the tabular ore body, the secondary field has a direction indicated by the arrow 22. At each of several measuring stations such as, for example, the measuring stations 23, 24 and 25, several measurements are made with the receiver coil positioned in successively different orientations, ranging from a position wherein the receiver coil axis is pointed toward the transmitter coil (coils mutually-perpendicular) to a position wherein the receiver coil axis is vertical (coils co-planar). A comparison of the several measurements serves to establish the attitude of the ore body.

Since it is virtually impossible to predict, with certainty, the shape of a particular ore body that might be encountered in prospecting, it is our practice, in applying our invention, to employ the measuring technique just described.

From the preceding discussion, it will be apparent that our method of electromagnetic prospecting comprises the transmission of a primary magnetic field for about 100 milliseconds, terminating the field, not abruptly, but at a linear rate over a few milliseconds and measuring the resultant secondary (or anomalous) field after complete termination of the primary magnetic field. By employing a ramp step waveform having a duration (rise time) of the order of 10 milliseconds, that portion of the anomalous transient decay curve corresponding to the relatively high frequency overburden response is suppressed so that the measured factor can be taken as indicative of the presence of a massive, deep-seated ore body. The measured factor is further refined, for diagnostic purposes, by an integration thereof over preselected time intervals. By judicious choice of the separation and relative orientation of the transmitter and receiver coils, it is possible to determine whether the measured transients are attributable to overburden or to a deep-seated, discretely bound ore body, and to establish the approximate size and depth of the ore body, as well as its approximate shape and attitude. The specific examples, presented herein for purposes of illustration and explanation, are not to be construed as limiting in the sense that coil orientations, spacings and time durations, other than those described, may be employed.

Reference, now, is made to FIGURE 12, which is a block diagram of apparatus for use in the practice of our invention. Included in FIGURE 12, are the various current and voltage waveforms applied to and/or delivered by the components shown in block form. The transmitter 30 provides a current pulse 31 having a rounded leading edge and a ramp trailing edge, which current pulse is applied to the transmitter coil 32. The receiver apparatus comprises the trigger pick-up coil 33 and a receiver coil 34. In actual practice, the trigger pick-up coil 33 always is oriented for maximum coupling with the transmitter coil, whereas the receiver coil 34 may be oriented in any desired manner. Further, the trigger pick-up coil is so phased that the leading edge of the initial voltage pulse 35, induced therein, is positive, such leading edge corresponding to the leading edge of the current pulse 31 applied to the transmitter coil. The voltage pulse 35 is amplified and shaped by the A.C. amplifier 36 and is applied to a counter 37, which counter registers the initial pulse (corresponding to time $t_0$) and energizes a relay 38 having a set of normally-open contacts. Closure of the relay contacts connects the output of the A.C. amplifier to the input of a delay device 39 which is designed to accept only the positive-going pulse 40 corresponding to time $t_1$ which is the beginning of the transmitter current ramp step. This pulse 40 is delayed until time $t_2$ (corresponding to the time when the transmitter current pulse 31 is completely terminated). Such delayed pulse 41, appearing at the output of the delay device, is employed to trigger the No. 0 uni-stable multivibrator 42 which provides a square wave output pulse 43 having a time duration of 100 milliseconds, the necessary read time of the apparatus.

A two-position relay, preceding the filter network in the relay and filter section 44, is arranged so that in the energized state the relay short-circuits the input to the filter thereby blocking the passage of the voltage pulse 35a, developed in the receiver coil, beyond the input to the attenuator 45. The square wave output pulse 43, of the multivibrator 42, is employed to energize this relay which, when deenergized, removes the short-circuit from the input of the filter and provides a triggering pulse 46 to the input of the No. 1 uni-stable multivibrator 47. Thus, immediately following termination of the transmitter coil current pulse (at time $t_2$), the received signal 48 is allowed to pass through the filter to the D.C. amplifier 49 and results in an amplifier output pulse 50 which is applied to the three gating circuits 51, 52 and 53.

When triggered, the No. 1 multivibrator 47 provides a square wave output pulse 54 which, in turn, opens the No. 1 gate 51 for a predetermined time interval ($t_2$ to $t_3$) constituting the first integration interval. Thus, the first time interval of the D.C. amplifier output pulse 55 is applied to the input of the No. 1 integrating amplifier 56. The time integral 57, thus obtained, is registered on the No. 1 meter 58.

Upon returning to its undriven state at time $t_3$, the No. 1 multivibrator 47 provides a triggering pulse 59 to the No. 2 multivibrator 60. The latter then supplies a square wave pulse 61 which actuates the No. 2 gate 52 which, in turn, allows the D.C. amplifier output pulse to enter the No. 2 integrating amplifier 62 for the time interval $t_3$ to $t_4$, as shown by the pulse 64. The time integral 63, of the applied pulse 64, is then registered on the No. 2 meter 65.

In like manner, when the multivibrator 60 returns to its undriven state, a pulse 66 triggers the No. 3 multivibrator 67 thereby providing a gating pulse 68 to the No. 3 gate 53, thereby allowing the remaining portion of the D.C. amplifier output pulse 69 to be integrated by the No. 3 integrating amplifier 70 and the integral 71 to be registered by the No. 3 meter 72.

The above-described operating sequence is repeated a number of times (that is, a number of spaced current pulses 31 are applied to the transmitter coil), the exact number being registered by the counter 37. Then that number is divided into the accumulated readings registered on the meters 58, 65 and 72, the results being proportional to the average integrals of the three, selected portions of the received signal 48.

The constants of the transmitter 30 are such that, referring to the instant the transmitter current pulse is applied as zero time ($t_0$), then;

$t_0 = 0$
$t_1 = 100$ milliseconds
$t_2 = 102$ to $115$ milliseconds.

Now, referring to the time $t_2$ as zero time for the receiver sequence, the receiver constants are such that:

$t_2 = 0$
$t_3 = 5$ milliseconds
$t_4 = 15$ milliseconds
$t_5 = 100$ milliseconds.

Inasmuch as the gating circuits are normally closed, their successive operation during predetermined time periods throughout substantially the entire time duration of the transient voltage induced in the receiver coil, results in the complete integration of the transient voltage. Such integration, however, is presented as three composite portions, as indicated by the three read-out devices.

The low pass filter is employed primarily to reject high frequency noise, yet pass the low frequency components (less than 50 cycles per second) of the anomaly curve. The behavior of the filter in the circuit is such that the anomalous transient decay curve is slightly distorted, but the resultant integrated output essentially is unaffected. Further, the filter input is short-circuited during the transmission period (as explained above) so that no residual voltage is retained in the filter during transmission cycles.

For purposes of calibration, a known voltage is introduced at the input to the D.C. amplifier. The preceding circuits are all passive and, therefore, their effects upon the received signal are known accurately beforehand. The anomaly value can then be obtained by comparison. Alternatively, the read-out devices may be provided with several scales calibrated in voltage values, each scale having a predetermined range corresponding to a set of fixed apparatus parameters. Knowing the coil separation, the receiver coil magnetic moment ($NA$ = number of turns times area) and orientation, and the transmitter coil orientation and magnetic moment ($NIA$ = coil turns times current times area) one is in a position to apply previously derived interpretation data to the measured anomaly.

The apparatus timing program, for one operating cycle, is shown graphically in FIGURE 13. It will be noted that voltage is applied to the transmitter coil for 100 milliseconds. This is sufficient time for the magnetic field to reach a quiescent state whereby its termination is equivalent to the application of a negative step. Upon termination of the voltage pulse to the transmitter coil, the current decays linearly to provide the ramp step having a time duration of 15 milliseconds. The voltage induced in the trigger pick-up coil rises and decays within the time period required for the transmitter coil current to reach quiescence and reverses direction during the decay period of the ramp step. Upon complete termination of current flow in the transmitter coil, the voltage induced in the trigger pick-up coil becomes zero and at this point there is effected a completion of the electrical circuit between the receiver coil and the measuring circuit. By this time, in the operating cycle of the apparatus, that component of the voltage induced in the receiver coil by the overburden has, for the most part, disappeared so that the actual transient voltage now remaining in the receiver coil comprises that component arising from the presence of an anomaly.

Simultaneously, with the completion of the electrical circuit between the receiver coil and the measuring circuit, the No. 1 gate circuit is opened and remains open for a period of 5 milliseconds. Immediately upon subsequent closing of gate circuit No. 1, gate circuit No. 2 is opened for a period of 10 milliseconds and immediately upon the closing of gate circuit No. 2, gate circuit No. 3 opens and remains open for 85 milliseconds, by which time the anomalous transient voltage has decayed substantially completely. Thus, the shaded areas 1, 2 and 3, under the anomalous transient voltage curve, are respectively integrated by the individual integrating amplifiers associated with the individual gate circuits.

As stated hereinabove, when the overburden is of a uniform nature and has a response with a notably lower time constant than that of the ore body, the two responses are readily separable by direct observation of the response curve. In such specific case, the described timing program and integration functions provide all of the necessary information. Merely traversing the region with a constant coil separation, making measurement at numerous stations, and comparing the indications of the read-out devices will provide a basis for establishing the location of the ore body. In the case where the overburden has a somewhat longer decay time constant, the separation of the ore body response from the overburden response is rendered more precise and practical by the three individual but successive integrations of the transient voltage curve. The area "1" under the curve (which is obtained by channel No. 1 in the receiver system) may include a significant overburden response, the area "2" may comprise overburden and ore body response, but the area "3" will be either pure, or essentially pure, ore body response.

In the case where the overburden is of highly irregular thickness and conductivity, and the ore body conductivity is, say, barely two orders of magnitude greater than appreciable portions of the overburden, the integrated transient decay curve does not directly indicate the presence of an ore body. In such case, the region is traversed again at successively different coil separations, and a comparison made of all the readings, or measurements. If the readings between maximum and minimum coil separations are not attenuated by about a factor of 4, it can safely be concluded that the responses are due to the presence of a deep-seated good conductor.

Reference, now, is made to FIGURE 14, which is a schematic circuit diagram of the ramp function generator. The power source 73 comprises a suitable number of storage batteries connected in series to provide the necessary transmitter circuit. In actual practice, these batteries normally are placed under charge when the transmitter is not operating. The circuit between the power source and the transmitter coil 32 is completed upon closure of the normally-open switch $S_1$ of a vacuum relay 74. A voltage limiter 75, comprising the reversely-disposed Zener diodes 76 and 77, is connected across the transmitter coil. The diode 77 blocks conduction through the voltage limiter during the time relay contacts $S_1$ are closed. However, when these contacts are opened, the back E.M.F. generated in the transmitter coil immediately rises to the Zener voltage of the diode 76 and current flows through the voltage limiter until the voltage again falls below the Zener voltage. The resultant voltage and current waveforms are illustrated in FIGURE 13.

Operation of the relay 74 is controlled by the timing pulse generator 78 consisting of a pair of transistors 79, 80 connected to operate as a conventional stable multivibrator and a current amplifier transistor 81. The capacitors 82 and 83 control the time during which the transistor 80 is conducting. During the time period when the transistor 80 is non-conducting, the biasing voltage applied to the input electrodes of the transistor 81 is such that this transistor is in the conducting state whereby the operating coil 84 of the relay 74 is energized and the relay contacts $S_1$ are closed, thereby initiating the transmitter cycle.

The anomalous voltage induced in the receiver coil (for a particular anomaly) is a direct function of the magnetic moment of the transmitter coil, namely, the product NIA, where, $N$=number of coil turns,
$I$=current in amperes, and
$A$=area of the coil in square meters.

Therefore, in the practical form of the apparatus, provision is made for varying the voltage of the power source, the area of the coil and the number of coil turns, in order to meet the requirements of specific prospecting programs.

It also follows that the choice of the recurrence rate of the transmitter pulses should be made compatible with the power source, that is, the average power consumption must not exceed the power available. This easily is effected by appropriate adjustment of the capacitors 82 and 83 in the timing pulse generator.

Reference, now, is made to FIGURE 15, which is a schematic circuit diagram of the receiver apparatus. The signal developed in the receiver coil 34 is appropriately attenuated by a constant impedance attenuator 45, its high frequency components removed in the low-pass filter 90, and subsequently amplified by the D.C. amplifier 49, the output of which is impressed upon the three gates 51, 52 and 53. The filter 90 is designed to effectively remove frequencies of 50 cycles per second and higher. It may here be pointed out that the most troublesome noise at 50 cycles and above may be man-made, e.g., power line noise. Consequently, the degree of filtering required may change with environment. The transmission of the receiver coil signal from the attenuator to the filter is controlled by the contacts 91 of a relay 92. When the relay is in the energized condition, as shown, the contacts connect the movable arm 93, of the attenuator, to ground whereby any remaining portion of the preceding transmission cycle is removed by short-circuiting to ground. At the proper time in the operating cycle of the receiver apparatus, the operating coil 94 of this relay is deenergized whereby the movable contact arm is disengaged from the front contact and engages the back contact thereby removing the short-circuit from the filter and completing the circuit between the rectifier 95 and ground.

The D.C. amplifier 49 is of conventional design and includes the ganged resistors 96, 97 which constitute a balance control, and the ganged resistors 98, 99, 100. The latter resistors provide a gain control which is operated in conjunction with the attenuator 45 to obtain the appropriate signal level at the input to the three gates 51–53.

The trigger pick-up coil 33 is oriented for maximum coupling with the transmitter coil and phased to provide a positive pulse into a conventional A.C. amplifier 36, at time $t_0$, corresponding to the instant that the voltage pulse is applied to the transmitter coil (see FIGURE 12). Such voltage pulse is amplified and shaped by the A.C. amplifier and applied to the counter 37 which registers the first count (visible in the window 101) and simultaneously energizes the operating coil of the relay 38, thereby closing the relay contacts 102 and applying the output of the A.C. amplifier 36 to the delay circuit 39 which is designed to respond only to that portion of the amplifier output which corresponds to transmitter pulse time $t_1$ (see FIGURE 12). The delay circuit 39 may be a conventional mono-stable multivibrator and, therefore, is not shown in detail. It is important to point out, however, that the input pulse to the delay circuit (corresponding to the time ($t_1$) which is the beginning of the transmitter current ramp step) appears at the output of the delay circuit at time $t_2$ (corresponding to the time when the transmitter current pulse is completely terminated).

The counter 37 is also a standard arrangement of flip-flop modules and is not shown in detail. It may be mentioned here that at the completion of a predetermined number of counts, the counter 37 maintains the relay contacts 102 in the open position until (1), the counter is reset by momentarily closing the manually-operable switch 103 and (2), another pulse is received from the A.C. amplifier 36. As stated hereinabove, the use of the counter permits a precise number of samples of the received signal to be obtained and then averaged to obtain an improved signal to noise ratio.

The No. 0 multivibrator 42 is a conventional uni-stable multivibrator wherein the transistor 104 is normally conducting, thereby developing a potential across the resistors 105 and 106, and energizing the operating coil 94 of the relay 92. Hence, the incoming signals from the attenuator are short-circuited to ground at all times other than the receiver read time. At time $t_2$ (see FIGURE 12) the pulse emerging from the delay circuit 39 triggers this multivibrator thereby interrupting conduction in the transistor 104. Consequently, the relay 92 is deenergized thereby transferring the relay movable contact from engagement with the front stationary contact into engagement with the back stationary contact. Such transfer of the relay contacts (1), allows passage of the signal output from the attenuator into the filter and (2), allows current to flow through the diode 95 and the resistor 107. The voltage developed across the resistor 107 is coupled through a capacitor 108 to provide a triggering pulse for the No. 1 mono-stable multivibrator 47. The multivibrator resistor 109 and capacitor 110 are so adjusted that the multivibrator provides a zero input to the base circuit of the transistors 111 and 112 of the No. 1 gate 51 over a time interval $t_2$ to $t_3$ (see FIGURE 12). The positive supply voltage, applied to the gate lead 113, then renders the transistors 111 and 112 non-conducting and the output of the D.C. amplifier 49 is impressed on the input of the No. 1 integrating amplifier 56. From the description given to this point, it will be apparent that the arrangement provides a fail-safe feature for the receiver inasmuch as the receiver program cannot be initiated until the receiver gate is open to the passage of the received signal.

The integrating amplifier 56 is a conventional balanced integrator arrangement wherein the amplifier 114 is a differential operational amplifier. It may here be pointed out, however, that due to the rapid decay of the received signal, a different gain level is required in each of the three integrating amplifiers 56, 62 and 70. This is obtained by appropriate adjustment of the resistor 115 in the case of the No. 1 integrating amplifier 56, and each of its counterparts in the other two integrating amplifiers 62 and 70.

The output of the No. 1 integrating amplifier 56, proportional to the time integral of the received voltage during the time interval $t_2$ to $t_3$, is registered by a suitable meter 58.

At the time period, $t_3$, the No. 1 multivibrator 47 returns to its undriven state, thus closing the No. 1 gate 51 and in so doing provides a triggering pulse to the No. 2 multivibrator 60. This multivibrator is identical to the No. 1 multivibrator 47, as well as the No. 3 multivibrator 67. However, the circuit constants of the No. 2 multivibrator 60 are adjusted so that it remains in its driven state during the time interval $t_3$ to $t_4$ (see FIGURE 12), thus holding the No. 2 gate 52 open for such time interval. Thus, the No. 2 integrating amplifier 62 integrates the output of the D.C. amplifier 49 during the time interval $t_3$ to $t_4$ and its output is registered by the meter 65. The No. 2 and No. 3 gates are identical to the No. 1 gate, and the No. 2 and No. 3 integrating amplifiers are identical to the No. 1 integrating amplifier.

In like manner, at time, $t_4$, the No. 3 multivibrator 67 is triggered when the No. 2 multivibrator 60 returns to quiescence, thereby opening the No. 3 gate 53 whereby the remaining portion of the D.C. amplifier output (between the time interval $t_4$ to $t_5$) is integrated by the No. 3 integrating amplifier 70 whose output is registered by the meter 72.

At time, $t_5$, all circuits are returned to their normal (undriven), state until another current pulse is applied to the transmitter coil whence the above-described sequence is repeated. These current pulses are repeated for a predetermined number of cycles (nominally 8) after which time the counter 37 automatically maintains the relay 38 in the deenergized, or open, position, thus preventing further measurement. Then the meter readings, divided by the number of measuring cycles, provide the average reading per cycle.

As has been stated hereinabove, the manually-operable reset switch 103 is momentarily closed to condition the receiver apparatus for operation. This switch resets the counter 37 to count zero. Also, the switches 116 and 117, associated with the No. 1 integrating amplifier 56, are similarly closed momentarily to clear the integrating amplifier of any retained information. Similar switches are provided on the No. 2 and No. 3 integrating amplifiers. All such switches preferably are mechanically coupled together and to the counter reset switch 103 whereby all switches may be operated simultaneously just prior to actual use of the receiver apparatus for measurement purposes.

Calibration of the meter readings in terms of volt seconds at the terminals of the receiver coil is effected by operation of the switch 118 to connect the calibrator 119 to the D.C. amplifier 49 in place of the filter 90. The receiver apparatus is allowed to run through a normal operating sequence. Since the attenuator and filter circuits are passive, their contribution is accurately known, and that information in conjunction with the correlation between the meter readings and the calibration voltage provides the necessary calibration information. Calibration is always necessary after any change in any of the active circuit constants in the other components of the receiver apparatus.

In summary, then, our new method of geophysical exploration comprises the following:

(1) The transmission of a primary magnetic field by applying spaced current pulses to a transmitter coil each pulse continuing for about 100 milliseconds, that is, for a long enough period of time to establish magnetic quiescence in the surrounding media, (2) Terminating the current pulses at a linear rate over a time period of from 2 to 15 milliseconds, the net result being the effective application of a negative ramp step waveform, (3) Determining the time integral of the voltage induced in a nearby receiver, or search, coil immediately following the termination of the mentioned ramp step, such voltage being induced in the receiver coil by eddy current fields in proximate conducting bodies, which fields, in turn, have been induced in the bodies by the termination of the transmitted primary magnetic field, and (4) Repeating the above procedures for various orientations and separations of the transmitter and receiver coils.

The information obtained by this method of exploration is sufficient to indicate;

(a) The presence of massive sulfide ore deposits of 5 million tons (or greater) having a conductivity of 1–1000 mhos/meter and located at a depth of 1000 feet (or greater) when such ore deposits are situated in or beneath conducting overburden having a conductivity between 10-1000 millimhos/meter, (b) The approximate shape and conductivity of the ore body, (c) The approximate distance of the ore body below the earth's surface, and (d) In the case of tabular ore bodies, the attitude thereof.

The herein-described method extends the range of geophysical explorations beyond that of prior electromagnetic systems and provides results having a greatly improved order of diagnostic certainty.

While we have given specific data regarding the orientation and separation of the transmitter and receiver coils, and the time durations of the charging current pulses and the integration cycles, these are to be considered as illustrative rather than limiting. Such factors may be varied within practical limits without departing from the essence of the invention. From a purely practical standpoint, the disclosed, three successive integrations of the transient decay curve are preferred, but it is apparent two such integrations, over selected time intervals may be employed.

Having now given a detailed description of the method and apparatus, those skilled in this art will have no difficulty in making various changes and modifications to adapt the disclosed method and apparatus for use under specific conditions. It is intended that such changes and modifications shall fall within the spirit and scope of the invention as recited in the following claims.

We claim:

1. An electromagnetic method of detecting the presence of a deep-seated conducting ore body situated in an environment exhibiting the order of $\frac{1}{100}$ the conductivity of the ore, comprising, (a) applying to a selected region of ground spaced magnetic field pulses of asymmetric form, the leading edge of each pulse being rounded and the trailing edge being a ramp of 2-15 milliseconds time duration, and (b) obtaining curves of the voltages induced in a nearby receiver coil immediately after the termination of each pulse, the rate of decay of the induced voltage curves being taken as indicative of the presence or absence of a sub-surface conducting ore body.

2. The invention as recited in claim 1, wherein the time duration of each magnetic field pulse is greater than 100 milliseconds, the ramp edge of each pulse is approximately 10 milliseconds and the pulse recurrence rate is of the order of four per minute.

3. A method of detecting the presence of a deep-seated conducting ore body situated in an environment exhibiting the order of $\frac{1}{100}$ the conductivity of the ore, comprising, (a) placing a transmitter coil and a receiver coil upon the region of ground to be investigated, (b) passing an asymmetric current pulse through the transmitter coil, said pulse having a time duration sufficient to reach a quiescent level, a rounded leading edge and a ramp trailing edge of 2-15 milliseconds duration, (c) obtaining a curve of the voltage induced in the receiver coil immediately after the termination of the current pulse, (d) changing the separation between the transmitter and receiver coils and repeating steps (b) and (c); the relative rate of decay of the induced voltage curves being taken as indicative of the presence or absence of a sub-surface ore body.

4. A method of detecting the presence of a deep-seated conducting ore body situated in an environment exhibiting the order of $\frac{1}{100}$ the conductivity of the ore, comprising, (a) placing a transmitter and a receiver coil upon the region of ground to be investigated, said coils having a first predetermined separation, (b) applying to the transmitter coil spaced asymmetric current pulses, each pulse having a time duration sufficient to reach a quiescent level, a rounded leading edge and a ramp trailing edge of 2-15 milliseconds, (c) obtaining curves of the voltages induced in the receiver coil immediately after termination of each current pulse, (d) moving one or both coils along the ground to a series of other positions while maintaining the said predetermined coil separation, and (e) repeating the steps (b) and (c) at each of the other positions of the coils; the relative rate of decay of the induced voltage curves being taken as indicative of the presence or absence of a sub-surface conducting ore body.

5. A method of detecting the presence of a deep-seated conducting ore body situated in an environment exhibiting the order of $\frac{1}{100}$ the conductivity of the ore, comprising, (a) placing a transmitter and a receiver coil upon the ground at a first measuring station, said coils having a first predetermined separation, (b) applying to the transmitter coil spaced current pulses, each pulse having a time duration sufficient to reach a quiescent level, a rounded leading edge and a ramp trailing edge of 2-15 milliseconds duration, (c) obtaining curves of the voltages induced in the receiver coil immediately after the termination of each current pulse, (d) changing the distance between the transmitter and receiver coils to a second predetermined separation and repeating the steps (b) and (c), (e) moving the transmitter and receiver coils to a series of other measuring stations, and (f) repeating the steps (b), (c) and (d) at each such other measuring station; the relative rate of decay of the induced voltage curves being taken as indicative of the presence or absence of a sub-surface conducting ore body.

6. Apparatus for use in geophysical exploration comprising, (a) a transmitter coil and a receiver coil, (b) a trigger coil magnetically coupled to the transmitter coil, (c) means developing in said transmitter coil spaced current pulses of ramp step waveform, said current pulses having a predetermined time duration and a ramp time duration of 2-15 milliseconds, (d) a voltage-limiter connected across the transmitter coil, said limiter being conductive at a voltage level substantially less than that of the back E.M.F. generated in the transmitter coil upon termination of the applied current pulse, (e) a filter having a frequency passband of 0-50 cycles per second, (f) a D.C. amplifier, (g) circuit elements applying the voltage induced in the receiver coil to the input circuit of said D.C. amplifier through the said filter, (h) a plurality of integrating amplifiers and associated gating means, (i) circuit elements connecting each gating means to the input of the associated integrating amplifier and to the output circuit of said D.C. amplifier, (j) an A.C. amplifier having an input circuit connected to the said trigger coil, (k) a first uni-stable multivibrator triggered by the output voltage pulses of said A.C. amplifier, said multivibrator producing, when triggered, first voltage pulses of predetermined time duration and which pulses open a first of said gating means, (l) a second uni-stable multivibrator triggered upon the termination of the voltage pulses of the first multivibrator and producing, when triggered, second voltage pulses of predetermined time duration and which pulses open a second of said gating means, (m) a third uni-stable multivibrator triggered upon the termination of the voltage pulses of the second multivibrator and producing, when triggered, third voltage pulses which pulses open a third of said gating means, and (n) individual read-out means actuated by each integrating amplifier.

7. The invention as recited in claim 6, wherein the time sequence of the voltage pulses produced by the three multivibrators is such that the gating means are open for the following sequential time periods, first gating means, $t_0$ to $t_1$,
second gating means, $t_1$ to $t_2$,
third gating means, $t_2$ to $t_3$, where
$t_0$ = the time at which a current pulse in the transmitter coil is completely terminated,
$t_1$ = approximately 5 milliseconds,
$t_2$ = approximately 10 milliseconds, and
$t_3$ = approximately 100 milliseconds.

8. Apparatus for use in geophysical exploration comprising, (a) a transmitter coil, a receiver coil and a trigger coil, said trigger coil being magnetically coupled to the receiver coil, (b) means developing in said transmitter coil a current pulse of ramp step waveform, (c) a voltage limiter connected across the transmitter coil, said limiter being conductive at a voltage level lower than that of the back E.M.F. generated in the coil upon termination of said current pulse, (d) a filter connected across the receiver coil and having a frequency pass band of 0–50 cycles per second, (e) a D.C. amplifier having an input circuit connected to the filter, (f) a plurality of normally-closed gating means each having operatively associated therewith an integrating amplifier, (g) circuit elements connecting each gating means to the output circuit of said D.C. amplifier and to the input circuit of the associated integrating amplifier, (h) individual readout means responsive to the output of the integrating amplifiers, (i) an A.C. amplifier having an input circuit connected to the trigger coil, (j) a first mono-stable multivibrator, (k) a delay circuit means connected between the output circuit of the A.C. amplifier and the said first multivibrator, said means applying a triggering pulse to the multivibrator at a predetermined time after receipt of an output voltage pulse from the A.C. amplifier, (m) control means normally blocking the application of the receiver coil voltage to the said D.C. amplifier, (n) means effective upon the triggering of said first multivibrator to actuate said control means to thereby apply the receiver coil voltage to the D.C. amplifier, (o) a plurality of additional mono-stable multivibrators corresponding in number to the said gating means, (p) circuit elements connecting each said additional multivibrator to one of the gating means such that the gating means is open during the time period when the associated multivibrator is in the triggered state, (q) means effective upon actuation of said control means to trigger one of the additional multivibrators, and (r) circuit elements connecting the said additional multivibrators such that a succeeding multivibrator is triggered when the preceding multivibrator returns to the quiescent state.

9. The invention as recited in claim 8, wherein there are first, second and third gating means, and wherein the gating means are successively opened by the associated multivibrator for the following time periods, first gating means, $t_0$ to $t_1$,
second gating means, $t_1$ to $t_2$,
third gating means, $t_2$ to $t_3$, where;
$t_0$ corresponds to the time when the current pulse in the transmitter coil is completely terminated,
$t_1$ = approximately 5 milliseconds,
$t_2$ = approximately 10 milliseconds,
$t_3$ = approximately 85 milliseconds.

10. The invention as recited in claim 8, wherein the current pulse applied to the transmitter coil has a time duration of approximately 100 milliseconds and a ramp time of 2–15 milliseconds.

11. The invention as recited in claim 8, including a voltage source and wherein the said control means is a relay having an operating coil connected to the said first multivibrator and a set of single-pole, double-throw contacts, said contacts being arranged to short-circuit the receiver coil when the relay operating coil is energized and to complete a circuit between the said voltage source and one of said additional multivibrators when the relay operating coil is deenergized.

12. The invention as recited in claim 8, including a pulse counter energized by the output voltage pulse of said A.C. amplifier, and a relay having an operating coil energized by the output voltage pulse of said A.C. amplifier, said relay having a set of normally-open contacts interposed between the output circuit of the A.C. amplifier and said delay circuit means.

13. The invention as recited in claim 12, wherein the delay circuit means applies a triggering pulse to the multivibrator at a time period corresponding to the time when the current pulse in the transmitter coil is completely terminated.

14. The invention as recited in claim 8, including a constant impedance attenuator connected between the receiver coil and the said filter.

15. The invention as recited in claim 8, including a source of calibration voltage, and manually-operable switch means operable to one or another position thereby to complete the circuit between the D.C. amplifier and either the receiver coil or the source of calibration voltage.

References Cited by the Examiner

UNITED STATES PATENTS

| | | | |
|---|---|---|---|
| Re. 24,464 | 4/1958 | Yost | 324—1 |
| 2,527,559 | 10/1950 | Lindblad et al. | 324—6 |
| 2,735,980 | 2/1956 | Wait | 324—7 |
| 3,020,471 | 2/1962 | Barringer | 324—6 |
| 3,090,910 | 5/1963 | Moran | 324—6 |
| 3,105,934 | 10/1963 | Barringer | 324— 6 X |

FOREIGN PATENTS 117,082 8/1946 Sweden.

WALTER L. CARLSON, Primary Examiner.

G. R. STRECKER, Assistant Examiner.